(12) United States Patent
Moen et al.

(10) Patent No.: US 7,581,607 B2
(45) Date of Patent: Sep. 1, 2009

(54) GRILLE ARRANGEMENT FOR A DRIVE UNIT ENCLOSURE

(75) Inventors: Richard A. Moen, Glenwood, MN (US); Dane M. Kallevig, Spicer, MN (US)

(73) Assignee: CNH America LLC, New Holland, PA (US)

( * ) Notice: Subject to any disclaimer, the term of this patent is extended or adjusted under 35 U.S.C. 154(b) by 700 days.

(21) Appl. No.: 11/420,127

(22) Filed: May 24, 2006

(65) Prior Publication Data
US 2007/0272459 A1 Nov. 29, 2007

(51) Int. Cl.
*B60K 11/04* (2006.01)
(52) U.S. Cl. ............. 180/68.6; 298/193.1; 180/69.24
(58) Field of Classification Search ............ 160/DIG. 1; 292/281; 296/193.09, 193.1, 193.11; 180/68.1, 180/68.6, 69.1, 69.2, 69.24, 69.25
See application file for complete search history.

(56) References Cited

U.S. PATENT DOCUMENTS

| | | | | | |
|---|---|---|---|---|---|
| 1,241,974 | A | * | 10/1917 | Hicks ..................... | 180/69.25 |
| 1,911,600 | A | * | 5/1933 | Bobertz et al. ............ | 180/69.2 |
| D97,230 | S | | 10/1935 | Gubitz | |
| D112,365 | S | * | 11/1938 | Dreyfuss ................. | D15/31 |
| 2,143,727 | A | * | 1/1939 | Baker ..................... | 180/54.1 |
| 2,151,229 | A | | 3/1939 | Piroumoff et al. | |
| 2,396,506 | A | * | 3/1946 | Harris .................... | 180/89.18 |
| 2,542,238 | A | | 2/1951 | Dreyfuss | |
| 2,549,524 | A | | 4/1951 | Rich | |
| 2,796,141 | A | * | 6/1957 | Schreiner ................ | 180/68.6 |
| 2,952,328 | A | * | 9/1960 | Steiner ................... | 180/69.2 |
| 3,792,551 | A | * | 2/1974 | Hallas .................... | 49/463 |
| 3,918,540 | A | * | 11/1975 | Haupt .................... | 180/69.2 |
| 4,071,107 | A | * | 1/1978 | Leighty .................. | 180/69.24 |
| 4,327,680 | A | * | 5/1982 | Dauwalder .............. | 123/195 C |
| 4,437,529 | A | * | 3/1984 | Fralish ................... | 180/69.2 |
| 4,630,698 | A | * | 12/1986 | Siewert et al. ........... | 180/69.24 |
| 4,707,021 | A | * | 11/1987 | Meier et al. ............. | 296/193.11 |
| 5,490,574 | A | | 2/1996 | Ishizumi et al. | |
| 5,806,620 | A | * | 9/1998 | DeRees et al. ........... | 180/69.21 |
| 6,058,903 | A | * | 5/2000 | Downham ............... | 123/198 E |
| 6,431,288 | B1 | | 8/2002 | Hoffart | |
| 6,837,326 | B2 | | 1/2005 | Haun et al. | |

(Continued)

FOREIGN PATENT DOCUMENTS

DE 2350077 4/1975

Primary Examiner—Christopher P Ellis
Assistant Examiner—Vaughn T Coolman
(74) Attorney, Agent, or Firm—Rebecca Henkel

(57) ABSTRACT

A grille arrangement for an enclosure of a drive unit of a self-propelled agricultural applicator is provided. The grille arrangement includes a screen, and a frame mounted by the screen. The frame includes a first strut connected by at least one movable latch assembly to the enclosure, and a second strut having a first linear portion aligned at an obtuse angle relative to a second linear portion in top plan view. The screen is attached at the first linear portion. With the frame and screen aligned at the obtuse angle relative to a vertical plane perpendicular to a forward direction of travel, the second linear portion slides into a notch at a vertical support strut fixed at the enclosure. Upon sliding the second linear portion in the notch, rotation of the frame rotates the second linear portion to a lock position securing the frame and screen at the enclosure.

20 Claims, 4 Drawing Sheets

U.S. PATENT DOCUMENTS 7,134,519 B2 * 11/2006 Imashige ............ 180/69.24
2004/0216934 A1   11/2004 Tomiyama et al.
2006/0055208 A1    3/2006 Troton

* cited by examiner

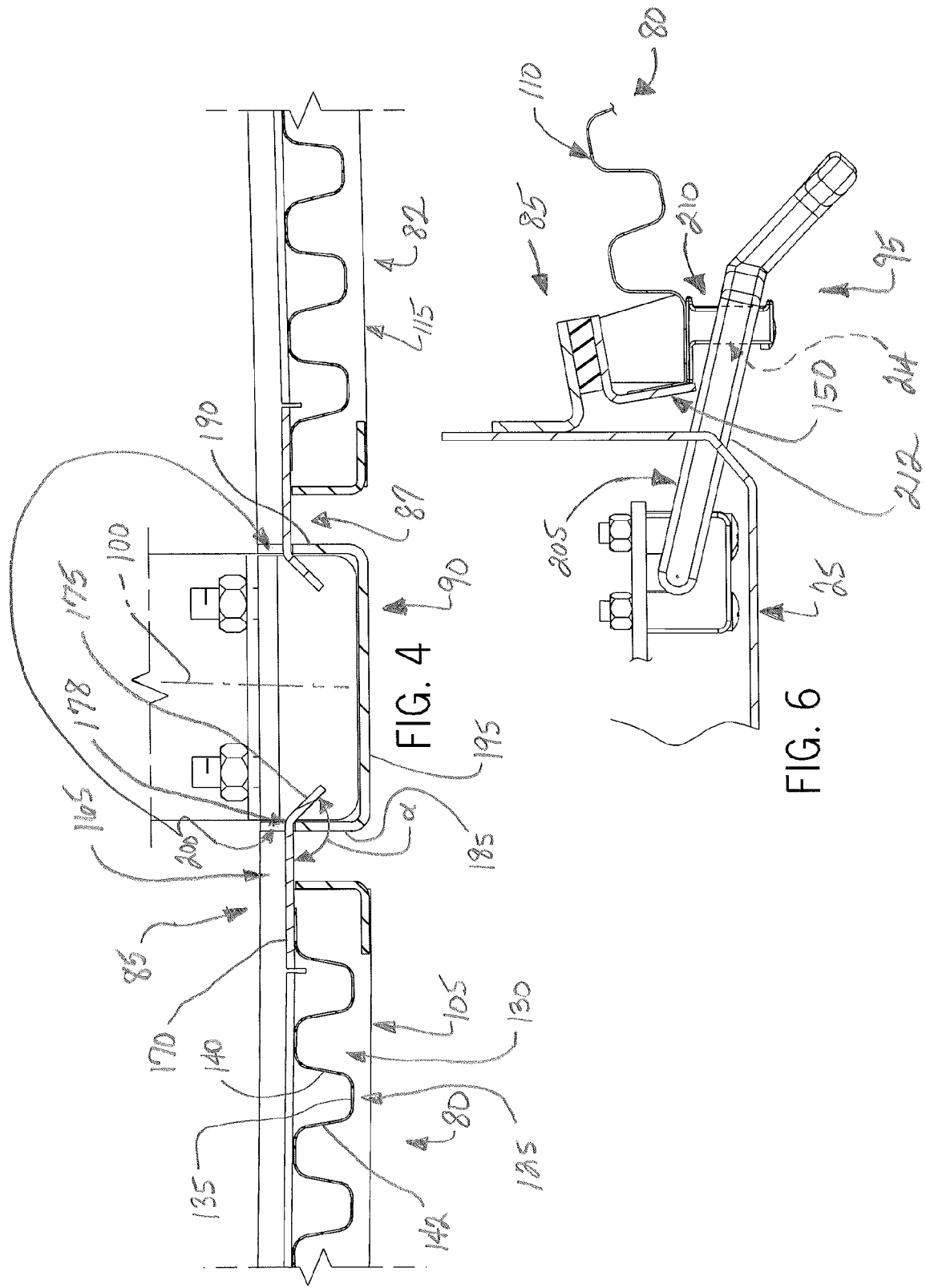

GRILLE ARRANGEMENT FOR A DRIVE UNIT ENCLOSURE

CROSS-REFERENCE TO RELATED APPLICATIONS

Not applicable.

BACKGROUND OF THE INVENTION

1. Field of Invention

The invention relates to a grille arrangement or for a drive unit enclosure and, more particularly, to a grille arrangement having a grille screen that can be detachably mounted in a confined space.

2. Related References

There are numerous types of self-propelled or vehicular agricultural applicators available today. Typical vehicular agricultural applicators include a chassis assembly supported on three or more tires. The chassis assembly is configured to support one or more bulk storage tanks or bins of product for application in an agricultural environment, usually before planting in the spring or after harvest in the fall. The types of agricultural products e.g., fertilizer, herbicide, pesticide, nutrients, etc. can vary. The vehicular agricultural applicator can also be utilized to tow various agricultural implements.

A certain known vehicular agricultural applicator includes an enclosure for a drive unit mounted toward a rearward end of the chassis assembly and rearward of a cab relative to a forward direction of travel. The grille is typically located in a confined space between the drive unit enclosure and the one or more bulk product tanks. Operators often have difficulty removing the grille arrangement in the confined space so as to gain access to certain routine service points (e.g., radiator) of the drive unit.

There is a desire for a drive unit enclosure having a grille arrangement configured to be readily de-attached and re-attached in a confined space. The grille arrangement should also be operable for a single person to readily detach and re-attach to the engine enclosure. The grille arrangement should also provide reliable sealing, latching and be capable of withstanding the vibration associated with operation of the enclosed drive unit.

SUMMARY OF THE INVENTION

The present invention provides a grille arrangement detachably mounted to an enclosure for a drive unit of a vehicular agricultural applicator. The grille arrangement includes a screen, and a frame mounted by the screen. The frame includes a first strut connected by at least one movable latch assembly to the enclosure, and a second strut having a first linear portion aligned at an obtuse angle relative to a second linear portion in top plan view. The screen is attached at the first linear portion. With the frame and screen aligned such that the second linear portion is generally perpendicular to a forward direction of travel, the second linear portion slides into a notch at a vertical support strut fixed at the enclosure. Upon sliding the second linear portion in the notch, rotation of the frame towards the enclosure also rotates the second linear portion to a lock position so as to secure the frame and screen at the enclosure.

In a preferred embodiment, the grille arrangement includes a U-shaped support strut generally aligned in a vertical direction and located aligned with a central longitudinal axis of the enclosure and vehicle. The grille arrangement includes a first frame mounted by a first screen located opposite the U-shaped support strut and central longitudinal axis from a second frame mounted by a second screen. The U-shaped support strut includes a pair of opposed leg portions and an intermediate portion extending therebetween. An upward most end of the U-shaped support strut is attached at the enclosure. The pair of opposed leg portions each includes a notch extending in a vertical direction along its length.

To mount the grille screen and frame to the enclosure, the second linear portion of each first and second frame aligns at a generally perpendicular angle relative to the forward direction in top plan view so as to slide through the notch in one of the pair of opposed leg portions of the U-shaped support. Upon receipt of the second linear portion, each frame and screen rotate rearwardly in a horizontal direction to the closed position sealed against the enclosure. With the frame and the screen in the closed position, the latch assembly is operable to move so as to attach and restrain a rearward end of each frame and the screen against the enclosure, thereby securing each frame and screen in locked positions.

In the closed, locked position, the grille screen and frame are positioned in sealed relationship with the enclosure. The grille arrangement does not include any hinges. The first linear portion of the second strut of the frame is aligned generally perpendicular to the one of the leg portions of the U-shaped support strut such that the second linear portion of the second strut is aligned at an obtuse angle relative thereto in engagement against one of the leg portion of the U-shaped support strut in restraint of the frame and screen at the enclosure. The screen includes a first vertical portion aligned generally perpendicular to a second vertical portion in top plan view. The first vertical portion of the screen is attached at the first linear portion of the first strut of the frame. The second vertical portion of the screen is attached at the second strut of the frame.

Release of the grille arrangement from the locked position with the enclosure includes movement of the latch assembly to an unlocked position. Upon unlatching the latch assembly, the respective screen and frame freely pivot forwardly at the junction of the first and second linear portions of the frame to a first partial pivot position relative to the forward direction of travel. At the partial pivot position, the screen and frame are aligned so that the second linear portion of the frame is aligned generally perpendicular to the forward direction of travel. From this partial pivot position, the second linear portion of the frame and screen are then free to slide in a linear outward direction from the notch in the U-shaped support strut, releasing the screen and frame from the enclosure. This configuration of the grille arrangement enhances the ease and readiness in accessing and servicing the drive unit (e.g., radiator) located inside the enclosure in a confined space.

In another embodiment, the present invention provides an engine enclosure for a drive unit of an agricultural applicator comprising a drive unit supported on a wheeled chassis assembly, a bulk storage tank mounted on the wheeled chassis assembly, and an enclosure configured to receive the drive unit, the enclosure having a rearward end that defines an opening located between the drive unit and the bulk storage tank. The enclosure also includes a grille arrangement configured to be mounted in the opening of the enclosure. The grill arrangement comprises; a screen and a frame mounted with the screen. The frame includes a first strut connected by at least one movable latch assembly to the enclosure, and a second strut located opposite the first strut. The second strut is generally vertically aligned and comprises a first linear portion aligned at an obtuse angle relative to a second linear portion in a top plan view, where the screen is attached at the first linear portion.

The present invention also provides a method of detachably mounting a grille arrangement to an enclosure for a drive unit of a vehicular agricultural applicator in general accordance with the forgoing description.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 illustrates a section view along line 4-4 in FIG. 2.

FIG. 5 illustrates a section view along line 5-5 in FIG. 2.

FIG. 6 illustrates a detailed section view along line 6-6 in FIG. 5.

DETAILED DESCRIPTION OF THE PREFERRED EMBODIMENTS

Figure 1:
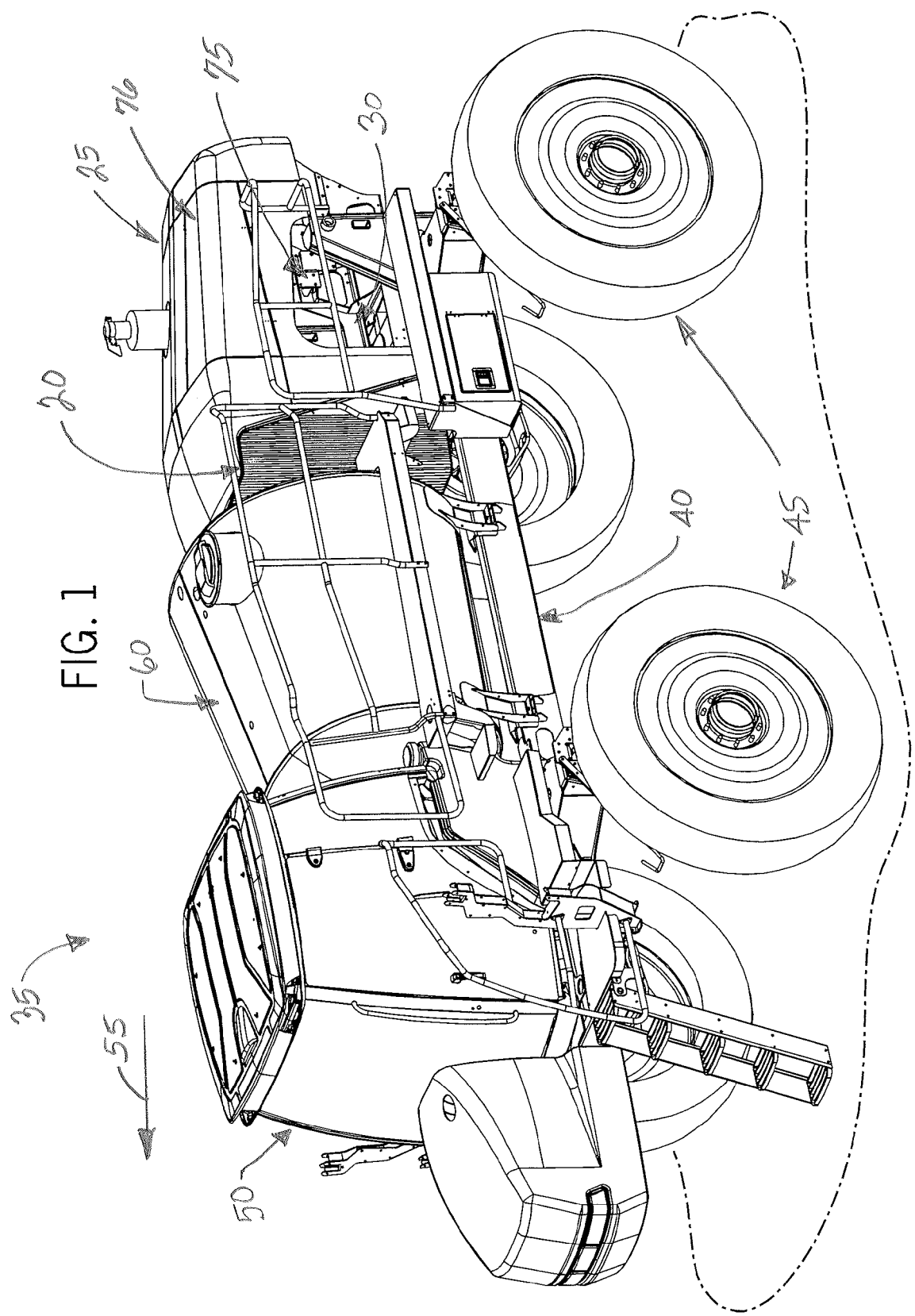
FIG. 1 illustrates an isometric view of a grille arrangement of the present invention mounted on a drive unit enclosure of a vehicle.

FIG. 1 illustrates a grille arrangement 20 in accordance with the present invention detachably mounted on an enclosure 25 of a drive unit 30 of a vehicle 35. The exemplary vehicle 35 is an agricultural applicator having a wheeled frame assembly 40 configured to support the drive unit 30 on a series of wheel assemblies 45. Although a four-wheeled vehicle 35 is shown, it is understood that the number of wheel assemblies 45 can vary. The vehicle 35 further includes a cab 50 supported on the wheeled frame assembly 40. The drive unit 30 is positioned rearward from the cab 50 relative to a forward direction of travel (illustrated by arrow 55) of the vehicle 35. A bulk storage tank 60 is also mounted on the wheeled frame assembly 40 so as to receive and carry product for distribution across a field. The exemplary bulk storage tank 60 is located between the drive unit 30 and the cab 50.

Still referring to FIG. 1, the conventional drive unit 30 includes a radiator (not shown) disposed at a forward end of the drive unit 30, a hydraulic reservoir (not shown), and an engine 75 disposed therebetween. In a known manner, the radiator operates to cool the engine 75. The hydraulic reservoir provides hydraulic flow and pressure to various hydraulically-driven systems (not shown) driven by the vehicle 35. The engine 75 is interconnected in a conventional manner to drive at least one of the wheel assemblies 45 and propel the wheeled frame assembly 40 in the forward direction of travel 55. Although a preferred drive unit 30 is described and shown, the type (e.g., diesel, etc.) and components (e.g., hydraulic system, pneumatic system, etc.) and combinations thereof comprising the drive unit 30 can vary and is not limiting on the invention.

Figure 2:
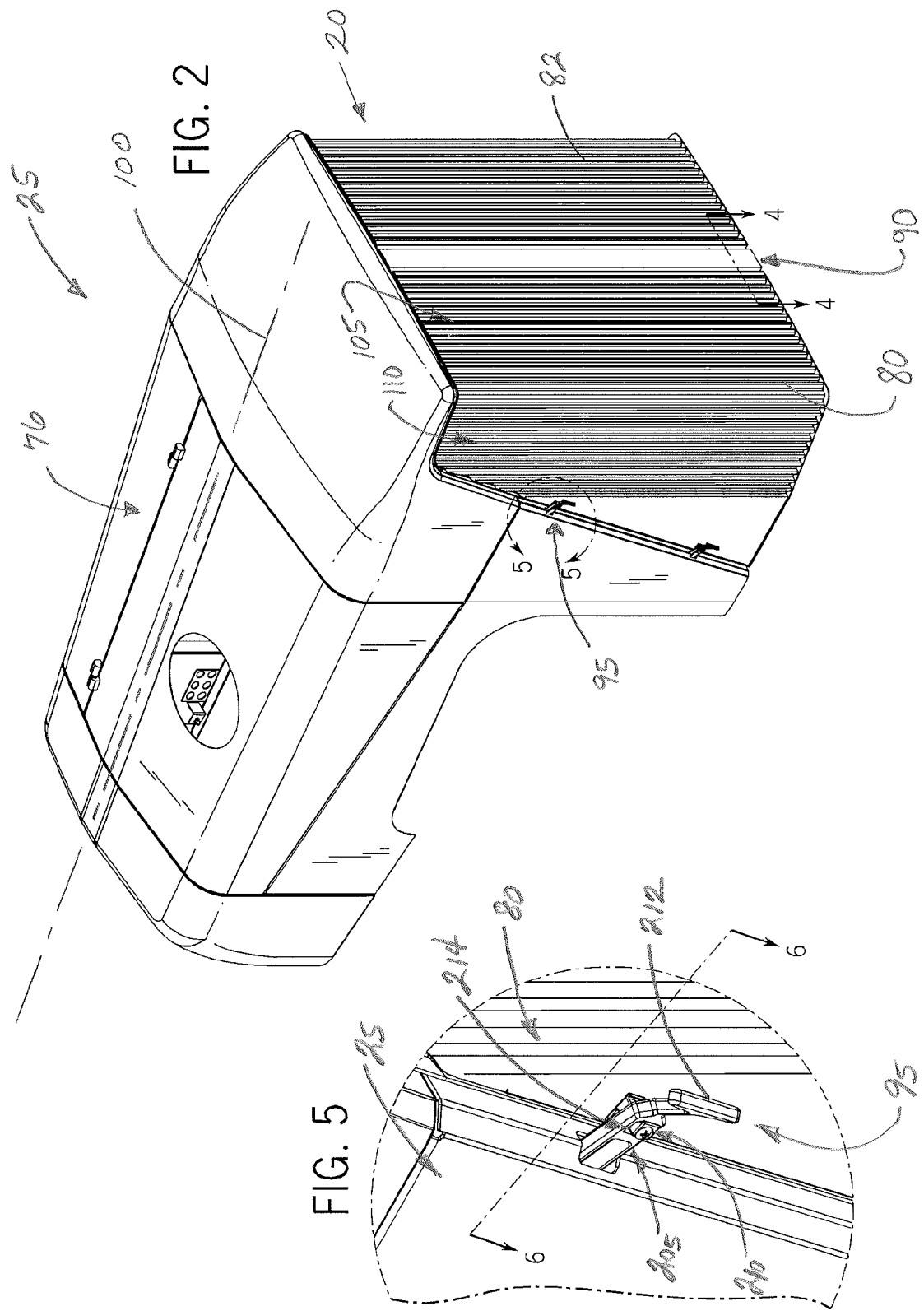
FIG. 2 illustrates a detailed isometric view of the grille arrangement mounted on the drive unit enclosure shown in FIG. 1, the grille arrangement in a locked, closed position.
Figure 3:
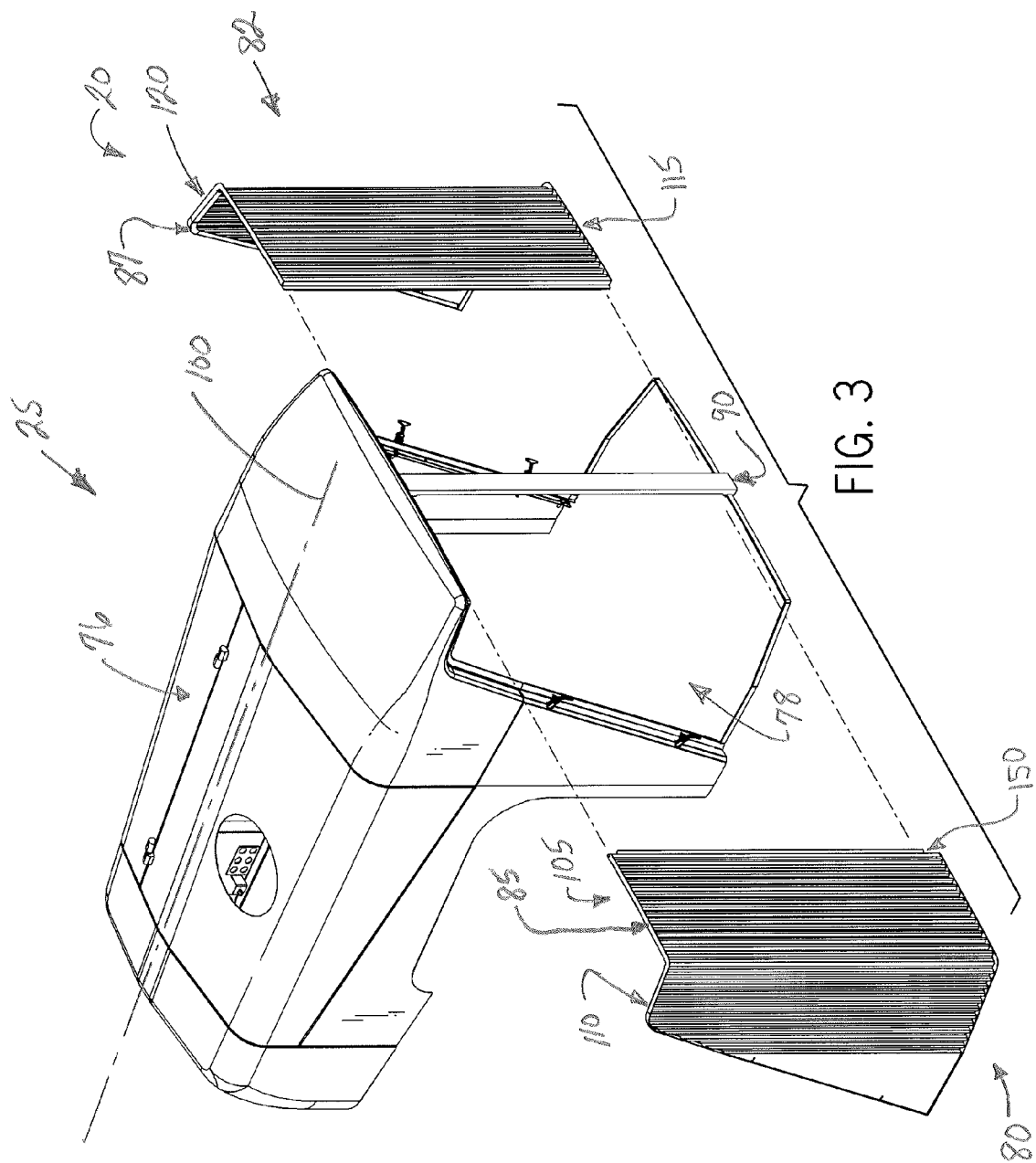
FIG. 3 illustrates a detailed isometric exploded view of the grille arrangement mounted on the drive unit enclosure shown in FIG. 2.

As illustrated in FIGS. 2-3, the exemplary enclosure 25 is generally configured with a pivotal hatch 76 to provide selected access to the drive unit 30 (See FIG. 1). The enclosure 25 is comprised of metal or other material to protect the drive unit 30 (See FIG. 1) enclosed therein from the elements. A forward end of enclosure 25 defines an opening 78 to receive the grille arrangement 20. The size and shape of the opening 78 and enclosure 25 can vary.

Still referring to FIGS. 2-3, the grille arrangement 20 of the invention generally includes screens 80 and 82 in respective frames 85 and 87, a central U-shaped support strut 90, and latch assemblies 95 configured to secure screens 80 and 82 and frames 85 and 87 in the opening 78 at the enclosure 25. The first frame 85 mounted by the first screen 80 is located opposite a central longitudinal axis 100 of the enclosure 25 from the second frame 87 mounted by the second screen 82.

The exemplary first screen 80 includes a forward portion 105 aligned generally perpendicular to a lateral portion 110 in top plan view. In a similar construction, the screen 82 includes a forward portion 115 aligned generally perpendicular to a lateral portion 120 in top plan view. Although the following description specifically refers to the screen 80 mounted in the frame 85, it should be understood that the screen 82 and frame 87 are constructed in a similar manner although not described in detail.

Referring specifically to FIG. 4, the screen 80 includes a plurality of convolutions 125 formed from a resilient, lightweight metal such as steel. Alternatively, the screen 80 may be formed from resilient, heat-resistant polymers or other materials. The screen 80 may further include perforations (not shown) extending therethrough from a front face to a rear face. The perforations (not shown) are dimensioned to restrict passage of smaller-sized environmental debris, such as, dust particles, chaff, or corn silks into the enclosure 25. In this way, the screen 80 provides unoccluded air flow through the perforations for cooling the radiator. Continuous, unobstructed flow through the screen 80 during the operation of the vehicle 35 advantageously delays the opportunities of overheating the engine 75. Furthermore, by inhibiting the passage of particulate debris into the enclosure, the screen 80 substantially contributes to maintenance of the radiator of the engine 75, thereby minimizing down-time of the vehicle 35.

The exemplary convolutions 125 are of a rectangular cross-section. Alternatively, convolutions 125 can have a rounder, more undulating cross-section. The convolutions 125 include intervening channels each defined by a base 135 and two oppositely-facing side walls 140 and 142 extending from the base 135 in connection to oppositely-facing lateral sides of adjacent convolutions 125 on the screen 80.

Cleaning of the screen 80 is a simple, cost-effective process that does not require shut-down of the engine 75 or parts removal. Intervening channels 130 between adjacent convolutions 125 provide a directed track on which the impacting debris can gravitationally move downwardly, ultimately falling directly to the ground or to be easily wiped off or removed by an operator's hand.

As shown in FIG. 3, the frame 85 is generally configured to attach and seal the screen 80 at the enclosure 25. Referring now to FIGS. 4 and 6, the exemplary frame 85 includes a first strut 150 (See FIG. 6) connected by at least one movable latch assembly 95 to the enclosure 25, and a second strut 165 (See FIG. 4) located forwardly and laterally opposite the first strut 150. As shown in FIG. 4, the second strut 165 is generally vertically aligned and includes a first linear portion 170 aligned at an obtuse angle ($\alpha$) relative to a second linear portion 175 in top plan view, defining a junction 178 therebetween. The screen 80 is attached via a weld or adhesive or fastener at the first linear portion 170.

FIGS. 2 and 3 illustrate U-shaped support strut 90 is generally aligned in a vertical direction and generally inline with the central longitudinal axis 100 of the enclosure 25. Referring to FIG. 4, the U-shaped support strut 90 includes a pair of opposed leg portions 185 and 190 and an intermediate portion 195 extending therebetween. An upward most end of the U-shaped support strut 180 is attached at the enclosure 25 (See FIG. 3). The pair of opposed leg portions 185 and 190 each includes a notch 200 extending therethrough. The notch 200 is generally a cutaway in the leg portions 185 and 190 that extends along a partial length of the support 180 in the vertical direction. In a closed and locked position, the first linear portion 170 of the second strut 165 of the frame 85 is aligned generally perpendicular to the leg portion 185 of the U-shaped support strut 180, and the second linear portion 175 of the second strut 165 is aligned at the obtuse angle (α) relative thereto in engagement against the leg portion 185 of the U-shaped support strut 180 in a manner that restrains the frame 85 and screen 80 at the enclosure 25.

Movement of the latch assembly 95 to an unlocked position and alignment of the screen 80 and the frame 85 at the obtuse angle from a vertical plane generally perpendicular to the forward direction of travel 55 in top plan view aligns the second linear portion 175 generally perpendicular to the one of the pair of opposed leg portions 185 and 190 of the U-shaped support strut 180 such that the second linear portion 175 slides through the notch 200 and the frame 85 detaches the from the enclosure 25.

Referring now to FIGS. 5 and 6, the latch assembly 95 detachably secures the grille arrangement 20 in the closed position at the enclosure 25 as shown in FIG. 1. The preferred first latch assembly 95 is located at the lateral portion 110 so as to detachably couple the grille arrangement 20 in the closed position at the enclosure 25. The latch assembly 95 generally includes a first latch portion 205 and a second latch portion 210 complementarily attachable to the first latch portion 205 so as to hold the screen 80 in the closed position at the enclosure 25. The first latch portion 205 includes a latch lever 212 pivotable about a generally vertically aligned axis. The latch lever 212 includes an opening 214 to receive the second latch portion 210 of the latch assembly 95 in a manner that secures the screen 80 and frame 85 at the enclosure 25. The number, location, and type (e.g., hook assembly, sliding bolt assembly, etc.) of latch assemblies 95 can vary.

In operation, assume for example that the grille arrangement 20 is in the closed positioned attached in the opening 78 at the forward end of the enclosure 25 (See FIG. 1). In the closed position, the grille screen 80 and frame 85 are positioned in general flush alignment with a forward face of the U-shaped support strut 90 mounted at the forward end of the enclosure 25. An operator pulls the lever 212 the latch assembly 95 laterally outward so as to release the rearward end of the frame 85 and mounted screen 80 from the enclosure 25. Upon unlocking the latch assembly 95, the screen 80 and frame 85 are free to pivot about the junction 178 of the second strut 165 of the frame 85 forwardly in a horizontal direction to a first partial pivot position such that the second linear portion 175 of the frame 85 is aligned generally perpendicular the central longitudinal axis 110 of the enclosure 25. From this partial pivot position, the perpendicular-aligned second linear portion 175 of the frame 85 relative to the leg portion 180 is free to slide laterally outward in the horizontal direction from the notch 200 in the U-shaped support strut 180, releasing the screen 80 and frame 85 from the enclosure 25. This configuration of the grille arrangement 20 enhances the ease and readiness in accessing and servicing the drive unit (e.g., radiator) located inside the enclosure 25 in a confined space between the enclosure and bulk fill tank 60 of a vehicular applicator 35.

It is understood that the above-description is of preferred exemplary embodiments of the present invention. For example, while preferred embodiments of the grille arrangement 20 in accordance with the invention are generally described with reference to a four-wheeled vehicular agricultural applicator 35, it should be understood that the invention is in no way so limited. The grille arrangement 20 can be configured for any type of drive unit enclosure 25 for a drive unit 30 of various types of vehicles 35, such as, construction vehicles, all-terrain (ATV) recreational vehicles, lawn-mowing tractors, etc. and is not limiting on the invention. Also, the grille arrangement 20 is not limited for application on a vehicle 35 having the drive unit 30 located rearward of the cab 50. Further, the grille arrangement 20 is not limited to being located between the drive unit 30 and the bulk storage tank 60 carried by the vehicle 35.

Many changes and modifications could be made to the invention without departing from the spirit thereof. The scope of these changes will become apparent from the appended claims.

We claim:

1. A grille arrangement for an enclosure of a drive unit of a self-propelled agricultural applicator, comprising:
   a screen;
   a frame mounted with the screen, the frame including a first strut connected by at least one movable latch assembly to the enclosure, and a second strut opposite the first strut, the second strut generally vertically aligned and comprising a first linear portion aligned at an obtuse angle relative to a second linear portion in top plan view, wherein the screen is attached at the first linear portion.

2. The grille arrangement as recited in claim 1, further comprising:
   a U-shaped support strut generally aligned in a vertical direction and having a pair of opposed leg portions and an intermediate portion extending therebetween, an upward most end of the U-shaped support strut attached at the enclosure.

3. The grille arrangement as recited in claim 2, wherein the pair of opposed leg portions each includes a notch, and wherein the second linear portion aligned at the obtuse angle in top plan view is configured to slide through the notch in one of the pair of opposed leg portions.

4. The grille arrangement as recited in claim 3, wherein the first linear portion of the second strut of the frame in a closed position is aligned generally perpendicular to the one of the leg portions of the U-shaped support strut such that the second linear portion of the second strut engages against the one of the leg portions of the U-shaped support strut in restraint of the frame and screen at the enclosure.

5. The grille arrangement as recited claim 2, wherein with the frame and the screen in a closed position, the latch assembly is operable to move so as to engage the enclosure in restraint of the frame and the screen against the enclosure.

6. The grille arrangement as recited in claim 5, wherein the screen includes a first vertical portion aligned generally perpendicular to a second vertical portion in top plan view, the first vertical portion attached at the first strut of the frame and the second vertical portion attached at the second strut.

7. The grille arrangement as recited in claim 6, wherein the second vertical portion of the screen is attached at the first linear portion of the second strut of the frame.

8. The grille arrangement as recited in claim 3, wherein movement of the latch assembly to an unlocked position and alignment of the screen and the frame at the obtuse angle from a vertical plane generally perpendicular to the forward direction of travel in top plan view aligns the second linear portion generally perpendicular to the one of the pair of opposed leg portions of the U-shaped support strut such that the second linear portion slides through the notch and the frame detaches the from the enclosure.

9. The grille arrangement as recited in claim 2, wherein the grille arrangement includes a first screen mounted by a first frame located opposite a central longitudinal axis aligned in the forward direction of travel from a second screen mounted by a second framed.

10. An agricultural applicator, comprising:
   a drive unit supported on a wheeled chassis assembly;
   a bulk storage tank mounted on the wheeled chassis assembly;
   an enclosure configured to receive the drive unit, the enclosure having a rearward end that defines an opening located between the drive unit and the bulk storage tank;
   a grille arrangement configured to be mounted in the opening of the enclosure, the grill arrangement comprising:
      a screen;
      a frame mounted with the screen, the frame including a first strut connected by at least one movable latch assembly to the enclosure, and a second strut opposite the first strut, the second strut generally vertically aligned and comprising a first linear portion aligned at an obtuse angle relative to a second linear portion in top plan view, wherein the screen is attached at the first linear portion.

11. The agricultural applicator as recited in claim 10, further comprising:
   a U-shaped support strut generally aligned in a vertical direction and having a pair of opposed leg portions and an intermediate portion extending therebetween, an upward most end of the U-shaped support strut attached at the enclosure.

12. The agricultural applicator as recited in claim 11, wherein the pair of opposed leg portions each includes a notch, and wherein the second linear portion aligned at the obtuse angle in top plan view is configured to slide through the notch in one of the pair of opposed leg portions.

13. The agricultural applicator as recited in claim 12, wherein the first linear portion of the second strut of the frame in a closed position is aligned generally perpendicular to the one of the leg portions of the U-shaped support strut such that the second linear portion of the second strut engages against the one of the leg portions of the U-shaped support strut in restraint of the frame and screen at the enclosure.

14. The agricultural applicator as recited claim 11, wherein with the frame and the screen in a closed position, the latch assembly is operable to move so as to engage the enclosure in restraint of the frame and the screen against the enclosure.

15. The agricultural applicator as recited in claim 14, wherein the screen includes a first vertical portion aligned generally perpendicular to a second vertical portion in top plan view, the first vertical portion attached at the first strut of the frame and the second vertical portion attached at the second strut.

16. The agricultural applicator as recited in claim 15, wherein the second vertical portion of the screen is attached at the first linear portion of the second strut of the frame.

17. The agricultural applicator as recited in claim 12, wherein movement of the latch assembly to an unlocked position and alignment of the screen and the frame at the obtuse angle from a vertical plane generally perpendicular to the forward direction of travel in top plan view aligns the second linear portion generally perpendicular to the one of the pair of opposed leg portions of the U-shaped support strut such that the second linear portion slides through the notch and the frame detaches the from the enclosure.

18. The agricultural applicator as recited in claim 11, wherein the grille arrangement includes a first screen mounted by a first frame located opposite a central longitudinal axis aligned in the forward direction of travel from a second screen mounted by a second frame.

19. The agricultural applicator as recited in claim 10, wherein the grille arrangement includes no hinges.

20. A method of mounting a grille arrangement in an opening of an enclosure for a drive unit of an agricultural applicator, the method comprising:
   providing the grille arrangement in a closed position attached in the opening at the forward end of the enclosure, the grille arrangement including a grille screen mounted in a frame and positioned in general alignment with a U-shaped vertical support strut located at the forward end of the enclosure, the frame including a first portion aligned at an acute angle relative the forward direction of travel and a second portion aligned perpendicularly to the forward direction of travel, wherein a junction between the first and second portions of the frame is engaged against the U-shaped vertical support strut;
   moving a latch mechanism so as to release a most rearward end of the frame and mounted screen;
   pivoting the screen at said junction of the first and second portions of the frame in a forward direction to a first partial pivot position relative to the forward direction wherein the second portion of the frame is in general perpendicular alignment with the forward direction of travel; and
   sliding the frame and screen in a transverse direction with respect to the agricultural applicator through a notch in the U-shaped vertical support strut, releasing the screen and frame.

* * * * *